(12) United States Patent
Mookherjee et al.

(10) Patent No.: US 7,175,871 B2
(45) Date of Patent: Feb. 13, 2007

(54) ACYCLIC ENOL ETHERS, ISOMERS THEREOF, ORGANOLEPTIC USES THEREOF AND PROCESSES FOR PREPARING SAME

(75) Inventors: Braja Dulal Mookherjee, Holmdel, NJ (US); Anubhav P. S. Narula, Hazlet, NJ (US); Subha M. Patel, Bridgewater, NJ (US); Edward Mark Arruda, Cliffwood, NJ (US); Patrick M. Merritt, Laurence Harbour, NJ (US)

(73) Assignee: International Flavors & Fragrances Inc, New York, NY (US)

( * ) Notice: Subject to any disclaimer, the term of this patent is extended or adjusted under 35 U.S.C. 154(b) by 289 days.

(21) Appl. No.: 10/195,663

(22) Filed: Jul. 15, 2002

(65) Prior Publication Data
US 2004/0013779 A1 Jan. 22, 2004

(51) Int. Cl.
*A23L 1/22* (2006.01)

(52) U.S. Cl. ............ 426/534; 426/3; 426/590; 426/650

(58) Field of Classification Search ............ 426/3, 426/534, 590, 650
See application file for complete search history.

(56) References Cited

U.S. PATENT DOCUMENTS

| | | | |
|---|---|---|---|
| 3,061,649 A | 10/1962 | Erickson et al. | |
| 4,058,490 A | 11/1977 | Prince | |
| 4,891,451 A | 1/1990 | Hoelderich et al. | |
| 5,767,325 A | 6/1998 | Schröder et al. | |
| 6,207,274 B1 | 3/2001 | Ferenc et al. | |
| 6,211,416 B1 * | 4/2001 | Teles et al. ........ | 568/691 |
| 6,213,409 B1 | 4/2001 | Warren et al. | |
| 6,239,087 B1 | 5/2001 | Mao et al. | |
| 6,245,376 B1 | 6/2001 | Pittet et al. | |
| 6,251,463 B1 | 6/2001 | Rossy et al. | |

OTHER PUBLICATIONS

Arctander, "Perfume and Flavor Chemicals (Aroma Chemicals)", 1969, vol. I, Monographs 833, "n-Decanal", 1105 "Dodecanal" and vol. II, Monographs 2397, "n-Octanal", 3028, "Undecanal" and 3035, 10-Undecen-1-al.
Peterson, et al, J.Essent.Oil Res., 14, 233-236 (May/Jun. 2002).
Killian, et al, J.Am.Chem.Soc., 57, 544 (1935).
Tu, et al, Flavour Fragr. J., 2002; 17:169-74.
Antonelli and Carnacini, J.Essent.Oil.Res., 13, 247-249 (Jul./Aug. 2001).

* cited by examiner

*Primary Examiner*—Leslie Wong
(74) *Attorney, Agent, or Firm*—Elizabeth M Quick; Joseph F. Leightner

(57) ABSTRACT

Described are synthetically produced substantially pure enol ether compositions which are cis and/or trans isomers of enol ethers having the structures:

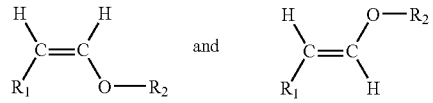

wherein $R_1$ is $C_4$–$C_{10}$ straight chain alkyl or $C_9$ 8-alkenyl; and wherein $R_2$ is $C_1$–$C_4$ alkyl, $C_3$–$C_4$ 2-alkenyl, $C_4$ 3-alkenyl or $C_{10}$ non-allenic alkadienyl and uses thereof in imparting, augmenting or enhancing the aroma and/or taste of a consumable material such as a perfume composition, a cologne, a perfumed article such as a soap, cosmetic, hair preparation or detergent, a foodstuff, a chewing gum or an alcoholic or non-alcoholic beverage such as a carbonated beverage or fruit liquer. Also described is a process for synthesis of such enol ethers by means of (i) first forming an acetal having the structure:

$$R_1\text{—}CH_2\text{—}CH(OR_2)_2$$

(ii) then carrying out a thermal decomposition reaction at pH<7 and then (iii) fractionally distilling the resulting reaction product to provide the enol ether.

8 Claims, No Drawings

ACYCLIC ENOL ETHERS, ISOMERS THEREOF, ORGANOLEPTIC USES THEREOF AND PROCESSES FOR PREPARING SAME

FIELD OF THE INVENTION

The invention relates to synthetically produced substantially pure cis and/or trans isomers enol ether compositions having sustainable heat, light and base stability, particularly useful when used in perfume compositions, perfumed articles, colognes, foodstuffs, chewing gums toothpastes and beverages.

BACKGROUND OF THE INVENTION

In the art of perfumery and in the art of flavors, the use of substances providing aldehydic notes and citrusy notes in augmenting, enhancing and/or imparting the aromas and tastes of consumable materials, e.g., perfume compositions, perfumed articles, colognes, foodstuffs, chewing gums and beverages is highly desirable and well documented, for example in Arctander, "Perfume and Flavor Chemicals (Aroma Chemicals)" (1969), Volume I, monographs 833, "n-decanal" and 1105, "dodecanal" and Volume II, monographs 2397, "n-octanal", 3028, "undecanal" and 3035, "10-undecen-1-al". Furthermore, the advantageous and highly desirable uses of such materials providing aldehydic and citrusy notes in the perfumery art to impart "fresh air-dried laundry" and "sun-dried laundry" aromas to various substrates, e.g., cotton fabric, as a result of utilizing perfumed articles, e.g., detergents and fabric softeners containing such substances is well documented for example in Arctander, "Perfume and Flavor Chemicals (Aroma Chemicals)" (1969), Volume I, monograph 1105, "dodecanal". Thus, aldehydic notes are, for example, those provided by the fatty aldehydes: n-octanal, n-decanal, n-dodecanal, n-undecanal and 10-undecen-1-al; and citrusy notes are, for example, those provided by the natural oils bergamot, lemon, lime, mandarin orange, petitgrain and neroli, the components of which are set forth in the prior art, for example, Peterson et al, *J. Essent. Oil Res.,* 14, 233–236 (May/June 2002). Thus, n-octanal has an orange-like, slightly fatty, honey-like aroma and a sweet, fruity, apricot-plum-like taste; n-decanal has a penetrating and very powerful sweet-waxy, orange-peel-like aroma with refreshing citrus-peel-like topnotes; and n-dodecanal has a sweet, waxy-herbaceous, very fresh and clean-floral aroma with lily-violet-like topnotes and balsamic undertones, also referred to as a "fresh-laundry aroma". More specifically, the term, "aldehydic aroma" is herein defined as an "orange-like, slightly fatty, honey-like, sweet-waxy, orange-peel-like, herbaceous, fresh and clean floral aroma with lily-violet-like and citrus-peel-like topnotes and balsamic undertones". However none of the aforementioned natural and synthetic materials which are known to provide such aldehydic and citrusy notes has the needed sustainable heat, light and base stability on ordinary use thereof. Although certain acyclic enol ethers have been disclosed to be useful in perfumery, e.g., 1-hexenyl ethyl ether and 1-heptenyl ethyl ether, U.S. Pat. No. 3,061,649 and $C_2$ and higher molecular weight enol ethers, are said to be useful in perfumery, the specific acyclic enol ethers or enol ether isomers or isomer mixtures of our invention and their advantageous, unobvious and expected organoleptic properties are neither disclosed or suggested. Nor does the prior art set forth the syntheses of the acyclic enol ethers or enol ether isomers or isomer mixtures of our invention. U.S. Pat. No. 5,767,325 and U.S. Pat. No. 4,891,451 disclose the thermal decomposition reactions of diacetals to form enol ethers, as do Killian et al. *J.Am. Chem.Soc.,* 57, 544(1935) and Claisen, *Berichte,* 31, No.170, 1019–1021(1898). The prior art does not disclose or suggest any techniques for the production of the specific acyclic enol ethers or enol ether isomers or isomer mixtures of our invention. Indeed a number of the specific acyclic enol ethers and enol ether isomers and isomer mixtures of our invention have been discovered by us to exist in blood orange vodka essence as well as in the essence of Otto of Bulgarian Rose, U.S. Pat. No. 6,239,087 that discloses the use as "pro-fragrances" or fragrance precursors of acetals such as the digeranyl acetal of decanal, but Mao et al neither discloses nor infers the use of such acetals as precursors for the enol ethers of our invention.

SUMMARY OF THE INVENTION

The present invention provides synthetically produced substantially pure enol ether compositions having sustainable heat, light and base stability which are cis and/or trans isomers of enol ethers having the structures:

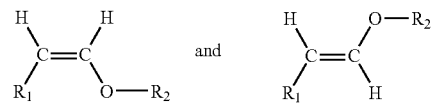

wherein $R_1$ is $C_4$–$C_{10}$ straight chain alkyl or $C_9$ 8-alkenyl; and wherein $R_2$ is $C_1$–$C_4$ alky $C_3$–$C_4$ 2-alkenyl, $C_4$ 3-alkenyl or $C_{10}$ non-allenic alkadienyl and uses thereof in imparting, augmenting or enhancing the aroma and/or taste of a consumable material such as a perfume composition, a cologne, a perfumed article such as a soap, cosmetic, hair preparation or detergent, a foodstuff, a chewing gum or an alcoholic or non-alcoholic beverage such as a carbonated beverage or fruit liquer.

The present invention also provides a process for synthesis of such enol ethers by means of (i) first forming an acetal having the structure:

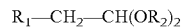

(ii) then carrying out a thermal decomposition reaction at pH<7 and (iii) then fractionally distilling the resulting reaction product to provide the enol ether.

More specifically, the present invention provides (i) synthetically produced substantially pure enol ether compositions having sustainable heat, light and base stability comprising a mixture of cis and trans isomers of enol ethers having the structures:

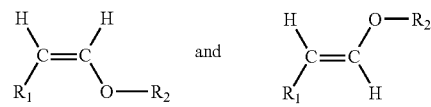

wherein the ratio of cis:trans isomer is greater than 0.5:1.0; wherein $R_1$ is $C_4$–$C_{10}$ straight chain alkyl or $C_9$ 8-alkenyl; and wherein $R_2$ is $C_1$–$C_4$ alkyl, $C_3$–$C_4$ 2-alkenyl, $C_4$ 3-alkenyl or $C_{10}$ non-allenic alkadienyl;

(ii) a synthetically produced substantially pure enol ether composition having sustainable heat, light and base stability comprising at least one enol ether having the structure:

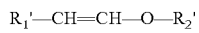

wherein $R_1'$ is $C_6$, $C_8$ or $C_9$ straight chain alkyl and wherein $R_2'$ is $C_1$–$C_4$ alkyl, $C_3$–$C_4$ 2-alkenyl, $C_4$ 3-alkenyl, $C_9$ 8-alkenyl or $C_{10}$ non-allenic alkadienyl; and (iii) a synthetically produced substantially pure enol ether composition having sustainable heat, light and base stability consisting essentially of at least one substantially pure cis enol ether having the structure:

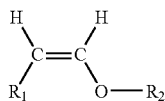

wherein $R_1$ is $C_4$–$C_{10}$ straight chain alkyl or $C_9$ 8-alkenyl; and wherein $R_2$ is $C_1$–$C_4$ alkyl, $C_3$–$C_4$ 2-alkenyl, $C_4$ 3-alkenyl, or $C_{10}$ non-allenic alkadienyl and uses thereof in imparting, augmenting or enhancing the aroma and/or taste of a consumable material such as a perfume composition, a cologne, a perfumed article such as a soap, cosmetic, hair preparation or detergent, a foodstuff, a chewing gum or an alcoholic or non-alcoholic beverage such as a carbonated beverage or fruit liquer.

The nature of the aromas and flavors which are enhanced, augmented and/or imparted as a result of the use of the enol ethers, enol ether isomers and mixtures of enol ether isomers of our invention are as follows: With respect to perfume compositions, perfumed articles and colognes: fresh, clean, ozoney, intense green, grassy green, citrusy, orange, aldehydic, waxy aldehydic, fruity (pineapple), fresh air-dried laundry, sun-dried laundry, fatty, carrot seed oil-like, dewy, rose, burning candle, cucumber, mushroom and orris aromas with fresh, ozoney, clean, aldehydic, citrus, fresh green grassy, floral, winey, fatty, waxy and tangerine topnotes and juicy, petitgrain, fresh orange, coriander, fresh air dried laundry, sun-dried laundry, aldehydic, fatty and citrusy undertones; and with respect to flavor compositions, green, tart, orange tastes with pulpy tart orange juice and orange peel nuances.

These and other embodiments of the present invention will be apparent by reading the following specification.

DETAILED DESCRIPTION OF THE INVENTION

The present invention is intended to include the following specific novel enol ethers and mixtures of isomers of enol ethers having sustainable heat, light and base stability, as well as a process for synthesizing same and uses thereof in (i) augmenting, imparting and/or enhancing the aroma of consumable materials including perfume compositions, perfumed articles and colognes and (ii) augmenting, imparting and/or enhancing the aroma and taste of consumable materials including foodstuffs, chewing gums, toothpastes and beverages.

| Identification of Enol Ether Substance | Organoleptic Properties |
|---|---|
| 1-ethoxyhex-1-ene (79:21 cis:trans isomer ratio) | Fresh, green aroma with citrus topnotes |
| 40:60 cis:trans-isomer mixture of 1-ethoxyhex-1-ene | Grassy green aroma with intense fresh green grassy, floral and citrus topnotes |
| 1-ethoxyhex-1-ene (50:50 trans:cis isomer ratio) | Green, fatty aroma with fatty undertones |
| 1-ethoxyhept-1-ene (89:11 cis:trans isomer ratio) | Intense green, aldehydic citrusy aroma |
| 1-ethoxyhept-1-ene (99:1 trans:cis isomer ratio) | Aldehydic, fruity pineapple-like aroma |
| 1-ethoxyoct-1-ene (trans isomer) | Citrusy, aldehydic, fresh air-dried laundry aroma |
| 1-ethoxyoct-1-ene (55.6:44.3 trans:cis isomer ratio) | Citrusy, fresh air-dried laundry aroma with citrus, fresh air-dried laundry undertones |
| 1-ethoxyoct-1-ene (cis isomer) | Citrusy aroma with fresh air-dried laundry topnote |
| 1-ethoxynon-1-ene (cis isomer) | Fresh, fatty, citrusy aroma with fatty, aldehydic undertones |
| 1-ethoxynon-1-ene (92:8 trans:cis isomer ratio) | Aldehydic, fatty, carrot seed oil aroma with fatty, aldehydic undertones |
| 1-ethoxynon-1-ene (52:47 cis:trans isomer ratio) | Aldehydic, citrusy, fatty, carrot seed oil aroma with fatty undertones |
| 1-methoxydec-1-ene (51:49 cis:trans isomer ratio) | Intense, fresh citrus, green, aldehydic, fresh dewy, rose aroma with a waxy aldehydic character and fresh, clean, waxy aldehydic and citrus topnotes and citrus undertones |
| 1-methoxydec-1-ene (69:31 cis:trans isomer ratio) | Citrusy, burning candle aroma |
| 1-methoxydec-1-ene (92:8 trans:cis isomer ratio) | Intense, fresh, citrus, green aldehydic, fresh dewy, rose aroma and fresh, clean, aldehydic and citrus topnotes and intense citrus undertones |
| 1-ethoxydec-1-ene (55:45 cis:trans isomer ratio) | Fragrance: Fresh, clean, aldehydic, citrus, green, dewy, rose aroma with fresh, clean, aldehydic, citrus topnotes; Flavor: Green, |

-continued

| Identification of Enol Ether Substance | Organoleptic Properties |
|---|---|
| | tart, orange taste with pulpy tart orange juice and orange peel nuances |
| 1-ethoxydec-1-ene (58:42 cis:trans isomer ratio) | Fresh, clean, aldehydic, citrus, green, dewy, rose aroma with fresh, clean, aldehydic, citrus topnotes |
| 1-ethoxydec-1-ene (96:4 trans:cis isomer ratio) | Strong, fresh, clean aldehydic, citrus, green, dewy, rose aroma with green, ozoney, floral, citrus, winey, fatty topnotes |
| 1-ethoxydec-1-ene (cis isomer) | Aldehydic, fatty, cucumber, orris aroma with waxy, fatty, aldehydic topnotes and juicy, petitgrain, fresh orange and coriander undertones |
| 1-ethoxyundec-1-ene (41:56 trans:cis isomer ratio) | Sun-dried laundry aroma with substantive sun-dried laundry undertones |
| 1-ethoxyundec-1-ene (90.3:9.0 trans:cis isomer ratio) | Sun-dried laundry aroma |
| 1-ethoxyundec-1-ene (91.6:7.9 cis:trans isomer ratio) | Fresh air-dried laundry aroma with fatty undertones |
| 1-ethoxyundeca-1,10-diene (trans isomer) | Aldehydic, green aroma |
| 1-ethoxyundeca-1,10-diene (82:18 cis:trans isomer ratio) | Aldehydic, citrus, orange aroma with tangerine topnotes |
| 1-ethoxyundeca-1,10-diene (48:47 trans:cis isomer ratio) | Aldehydic, ozoney aroma |
| 1-ethoxydodec-1-ene (trans isomer) | Aldehydic, citrus aroma |
| 1-ethoxydodec-1-ene (50:50 cis:trans isomer ratio | Fresh, aldehydic, citrus aroma |
| 1-ethoxydodec-1-ene (87.4:12.6 cis:trans isomer ratio) | Mushroom aroma | and, in addition, cis,cis-geranyloxyhept-1-ene, cis,trans-geranyloxyhept-1-ene, trans,cis-geranyloxyhept-1-ene, trans,trans-geranyloxyhept-1-ene, cis-1 (prop-2-en)oxyoct-1-ene and trans-1(prop-2-en)oxyoct-1-ene.

In carrying out the syntheses of the enol ether compositions of our invention, the first step in the syntheses for forming the diacetal by means of reaction of the aldehyde having the structure:

$$R_1-CH_2-CHO$$

with an acetalization reagent may be according to one of the following reactions:

$$R_1-CH_2-CHO+(R_2O)_3CH \rightarrow R_1-CH_2-CH(OR_2)_2 \quad (i)$$

$$R_1-CH_2-CHO+R_2OH \rightarrow R_1-CH_2-CH(OR_2)_2 \quad (ii)$$

which reactions are carried out, preferably under acidic conditions using, preferably, methanolic or ethanolic solutions of p-toluenesulfonic acid, ammonium nitrate or citric acid at a temperature in the range of from about 40° C. up to about 65° C. as exemplified in Example VII, infra, and in Example 4 of U.S. Pat. No. 6,239,087, the disclosure of which is incorporated herein by reference. When carrying out reaction (i), supra, preferably $R_2$ is methyl or ethyl.

The second step of thermal decomposition, and thus, dealcoholization of the diacetal is carried out at pH<7, that is, acidic conditions, preferably at a pH in the range of from about 6 up to 7, a pressure of from about 200 mm Hg up to about 6000 mm Hg and a temperature in the range of from about 150° C. up to about 225° C. The reaction may be carried out in the presence of a thermal decomposition reaction catalyst which may be (a) a mixture of (i) pyridine or quinoline and (ii) phosphorous pentoxide or phosphoric acid or (b) a borosilicate zeolite and/or iron silicate zeolite thermal decomposition reaction catalyst disclosed in U.S. Pat. No. 4,891,451, the disclosure of which is incorporated herein by reference, or (c) a porous heterogeneous catalyst such as highly porous α-aluminum oxide, silicon dioxide, titanium oxide or mixtures thereof as disclosed in U.S. Pat. No. 5,767,325, the disclosure of which is herein incorporated by reference or (d) a mixture of trimethylsilyl triflate and N,N-diisopropylethylamine. The thermal decomposition reaction of our invention most preferably is carried out in the presence of a mixture of pyridine and phosphoric acid at a temperature in the range of from about 150° C. up to about 225° C.

A key feature of the process of our invention resides in the step of fractionally distilling the resulting reaction mass in such a manner as to physically separate various mixtures of cis and trans isomers of the enol ethers resulting from the thermal decomposition reaction by means of separation of the distillation fractions and then bulking the resulting fractions in accordance with the desired organoleptic properties of the ultimate mixture of bulked fractions.

The enol ether compositions of our invention and one or more auxiliary perfume ingredients, including, for example, alcohols, aldehydes, nitriles, esters, cyclic esters, ketones, ethers other than enol ether compositions of our invention, hydrocarbons and natural essential oils may be admixed so that the combined odors of the individual components produce a pleasant and desired fragrance particularly and preferably in citrus fresh air-dried laundry, sun-dried laundry and floral fragrances. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In the perfume composition, it is each of the individual components which contribute to its particular olfactory characteristics, but the over-all effect of the perfume composition will be the sum of the effects of each of the ingredients. Thus, the enol ether compositions of our invention can be used to alter the aroma characteristics of a perfume composition, for example, by utilizing or moderating the olfactory reaction contributed by at least one other ingredient in the composition.

The amount of enol ether composition of our invention which will be effective in perfume compositions depends on many factors including the other ingredients, their amounts and the effects which are desired. It has been found that perfume compositions containing as little as 0.01% of the enol ether composition of our invention and even less (e.g. 0.005%) can be used to impart fresh, clean, ozoney, intense green, grassy green, citrusy, orange, aldehydic, waxy aldehydic, fruity pineapple-like, fresh air-dried laundry, sun-dried laundry, fatty, carrot seed oil-like, dewy, rose, burning candle, cucumber, mushroom and orris aromas with fresh, ozoney, clean, aldehydic, citrus, fresh green grassy, floral, winey, fatty, waxy and tangerine topnotes and juicy, petitgrain, fresh orange, coriander, fresh air dried laundry, sun-dried laundry aldehydic, fatty and citrusy undertones to soaps, anionic, cationic, nonionic and zwitterionic detergents, fabric softener articles, fabric softener compositions, hair preparations, cosmetics and other products. The amount employed can range up to 10% of the fragrance components and will depend on considerations of cost, nature of the end product, the effect desired on the finished product and the particular fragrance sought.

The enol ether compositions of our invention are useful, taken alone or in perfume compositions as olfactory components in anionic, cationic, nonionic and zwitterionic detergents, soaps, fabric softener compositions, fabric softener articles for use in clothes dryers (e.g. BOUNCE®, a registered trademark of the Procter & Gamble Company of Cincinnati, Ohio, U.S.A.), space odorants and deodorants, perfumes, colognes, toilet water, bath preparations, such as bath oils and bath solids; hair preparations, such as lacquers, brilliantines; creams; deodorants; hand lotions; sun screens; powders, such as talcs, dusting powders, face powders and the like. When used as an olfactory component in perfume compositions or perfumed articles, such as anionic, cationic, nonionic and zwitterionic detergents, and in fabric softener compositions and fabric softener articles (e.g., for use in clothing dryers) as little as 0.05% of the enol ether compositions of our invention will suffice to impart fresh, clean, ozoney, intense green, grassy green, citrusy, orange, aldehydic, waxy aldehydic, fruity pineapple-like, fresh air-dried laundry, sun-dried laundry, fatty, carrot seed oil-like, dewy, rose, burning candle, cucumber, mushroom and orris aromas with fresh, ozoney, clean, aldehydic, citrus, fresh green grassy, floral, winey, fatty, waxy and tangerine topnotes and juicy, petitgrain, fresh orange, coriander, fresh air dried laundry, sun-dried laundry aldehydic, fatty and citrusy undertones. Generally no more than 5% of the enol ether composition of our invention is required in the perfume composition or in the perfumed article.

In addition, the perfume composition or fragrance composition of our invention can contain a vehicle or carrier for the enol ether compositions of our invention. The vehicle can be a liquid such as a non-toxic alcohol (e.g. ethanol), a non-toxic glycol (e.g. propylene glycol) or the like. The carrier can also be an absorbent solid, such as a gum (e.g., gum arabic, or xanthan gum) or components for encapsulating the composition (such as gelatin) as by means of coacervation. The carrier can be a microporous polymer for use in conjunction with particulate microporous polymer delivery systems as disclosed in U.S. Pat. No. 6,213,409, the disclosure of which is incorporated herein by reference or for use in conjunction with fiber delivery systems as disclosed in U.S. Pat. No. 6,207,274, the disclosure of which is incorporated herein by reference.

It will be appreciated from the present disclosure that the enol ether compositions as set forth above according to the present invention can be used to alter, vary, fortify, modify, enhance or otherwise improve the flavor of consumable materials which are ingested, consumed or otherwise organoleptically sensed. Examples of such consumable materials are foodstuffs, chewing gums, toothpastes, carbonated beverages, non-carbonated drinks and alcoholic beversages including fruit liquers and flavored vodka beverages. The enol ether compositions of our invention are particularly useful in imparting, enhancing and/or augmenting the flavors of citrus-flavored foodstuffs, chewing gums, toothpastes and beverages. The term "citrus" includes bergamot, orange, pummelo, lemon, lime, limona and tangerine. When the enol ether compositions of our invention are used in flavoring compositions, they can be combined with conventional flavoring materials or adjuvants. Such co-ingredients or flavoring adjuvants are well known in the art for such use and have been extensively described in the literature.

Requirements of such Adjuvant Materials are:
that they be non-reactive with the enol ether compositions;
that they be organoleptically compatible with the enol ether compositions; and
that they be ingestibly acceptable and thus non-toxic or otherwise non-deleterious.

Apart from these requirements, conventional materials can be used and broadly include other flavor materials, vehicles, stabilizers, thickeners, surface-active agents, conditioners and flavor intensifiers. Specific preferred flavor adjuvants include, but are not limited to (i) the tastand additives disclosed and claimed in U.S. Pat. Nos. 6,245,376 and 6,251,463, the disclosures of which are herein incorporated by reference; (ii) volatile constituents of pummelo, orange, tangerine and lime peel oils including cis-carveol, geranyl acetate, p-cymene, d-limonene and nootkatone as disclosed by Tu et al, *Flavour Fragr. J.* 2002; 17: 169–74; (iii) constituents of bergamot cold-pressed essential oil (*Citrus bergamia* Risso) including α-thujene, α-pinene, sabinene, β-pinene, myrcene, p-cymene, d-limonene, trans-β-ocimene, cis-β-ocimene, γ-terpinene, terpinolene, linalool, linalyl acetate, neryl acetate, geranyl acetate, and β-bisabolene as disclosed by Antonelli and Carnacini, *J.Essent.Oil-.Res.*, 13, 247–249(July/August 2001) and (iv) components of orange fruit (*Maclura pomifera*) including 2-hexanone, 2-furfuraldehyde, α-cubebene, α-copaene, β-elemene, β-caryphyllene, β-selinene, γ-cadinene, 1-epi-bicycloses-quiphellandrene and β-sesquiphellandrene.

The term substantially pure is understood to mean that the recited compound is present in the amount of at least about 90%, preferably at least about 95% and more preferably at least 95% by weight of the total mixture of the stereoselective isomer.

The following examples are provided as specific embodiments of the present invention. Other modifications of this invention will be readily apparent to those skilled in the art. Such modifications are understood to be within the scope of this invention. As used herein, all percentages are weight percent unless otherwise noted, "ppm" is understood to stand for parts per million and "g" is understood to be "grams".

EXAMPLE I

PREPARATION OF 1-ETHOXYHEX-1-ENE

Reaction:

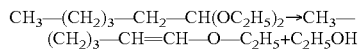

Into a 2 liter reaction flask equipped with stirrer, thermometer, heating mantle, addition funnel, vacuum apparatus, and reflux condenser the following ingredients were added at 18° C.:

| | |
|---|---|
| Primol (mineral oil) | 24.1 g |
| Pyridine | 25.2 g |
| Phosphoric acid | 35.4 g. |

The resulting mixture then exothermed to 46° C. and, with stirring, 1096 g n-hexanal diethyl acetal was added and the pressure over the reaction mass was reduced to 300 mm Hg. The reaction mass temperature was then raised to 127° C. While maintaining the reaction mass temperature in the range of 127–163° C., with stirring, over a time period of 7 hours, the ethanol reaction product was continuously distilled. At the end of the 7 hour reaction period, the vacuum apparatus was disconnected from the reaction vessel and the contents thereof were cooled to 25° C. and placed in a vacuum distillation apparatus equipped with a fractionation column and reflux condenser. The reaction mass was then distilled at the following conditions yielding fractions having the following content and organoleptic properties:

| Fraction Number(s) | Vapor Temperature | Pressure | Fraction(s) Content | Organoleptic Properties |
|---|---|---|---|---|
| 22 | 82° C. | 90 mm Hg | 1-ethoxyhex-1-ene (79:21 cis:trans isomer ratio) | Fresh, green aroma with citrus topnotes |
| 23–45 | 80–87° C. | 80–84 mm Hg | 1-ethoxyhex-1-ene (40:60 cis:trans isomer ratio) | Grassy green aroma with intense fresh green grassy, floral and citrus topnotes |
| 46 | 88° C. | 80 mm Hg | 1-ethoxyhex-1-ene (50:10 trans:cis isomer ratio) | Green, fatty aroma with fatty undertone |

The resulting structures are confirmed by means of GC, mass spectral, IR and NMR analyses. The NMR data and interpretations are set forth in the following tables:

(a) Cis Isomer:

| NMR Data | Interpretation |
|---|---|
| 3H, 0.9 ppm | C$\underline{H}_3$—(CH$_2$)$_3$— |
| 3H, 1.28 ppm | C$\underline{H}_3$—(CH$_2$)—O— |
| Two 2H, 1.38 ppm | CH$_3$—(C$\underline{H}_2$)$_2$— |
| 2H, 2.05 ppm | —C$\underline{H}_2$—CH=CH—O— |
| 2H, 3.75 ppm | —O—C$\underline{H}_2$—CH$_3$ |
| 1H, 4.35 ppm, J=7.6 Hz | —CH$_2$—C$\underline{H}$=CH—O— |
| 1H, 5.93 ppm, J=6.2 Hz | —CH$_2$—CH=C$\underline{H}$—O— |

(b) Trans Isomer:

| NMR Data | Interpretation |
|---|---|
| 3H, 1.0 ppm | C$\underline{H}_3$—(CH$_2$)$_3$— |
| 3H, 1.45 ppm | C$\underline{H}_3$—(CH$_2$)—O— |
| Two 2H, 1.45 ppm | CH$_3$—(C$\underline{H}_2$)$_2$— |
| 2H, 2.03 ppm | —C$\underline{H}_2$—CH=CH—O— |
| 2H, 3.90 ppm | —O—C$\underline{H}_2$—CH$_3$ |
| 1H, 4.90 ppm, J=16.5 Hz | —CH$_2$—C$\underline{H}$=CH—O— |
| 1H, 6.4 ppm, J=13.5 Hz | —CH$_2$—CH=C$\underline{H}$—O— |

EXAMPLE II

PREPARATION OF 1-ETHOXYHEPT-1-ENE

Reaction:

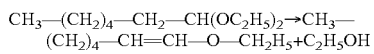

Into a 2 liter reaction flask equipped with stirrer, thermometer, heating mantle, addition funnel, vacuum apparatus, and reflux condenser the following ingredients were added at 18° C.:

| | |
|---|---|
| Primol (mineral oil) | 21.6 g |
| Pyridine | 20.3 g |
| Phosphoric acid | 28.4 g. |

The resulting mixture then exothermed to 45° C. and, with stirring, 902 g n-heptanal diethyl acetal was added and the pressure over the reaction mass was reduced to 300 mm Hg. The reaction mass temperature was then raised to 137° C. While maintaining the reaction mass temperature in the range of 137–156° C. with stirring, over a time period of 8 hours, the ethanol reaction product was continuously distilled. At the end of the 8 hour reaction period, the vacuum apparatus was disconnected from the reaction vessel and the contents thereof were cooled to 25° C. and placed in a vacuum distillation apparatus equipped with a fractionation column and reflux condenser. The reaction mass was then distilled at the following conditions yielding fractions having the following content and organoleptic properties:

| Fraction Number(s) | Vapor Temperature | Pressure | Fraction(s) Content | Organoleptic Properties |
|---|---|---|---|---|
| 16 | 94° C. | 70 mm Hg | 1-ethoxyhept-1-ene (89:11 cis:trans isomer ratio) | Intense green, aldehydic, citrusy aroma |
| 49 | 103° C. | 73 mm Hg | 1-ethoxyhept-1-ene (99:1 trans:cis isomer ratio) | Aldehydic, fruity pineapple-like aroma |

The resulting structures were confirmed by means of GC, mass spectral, IR and NMR analyses. The NMR data and interpretations are set forth in the following tables:

(a) Cis Isomer:

| NMR Data | Interpretation |
|---|---|
| 3H, 0.88 ppm | C$\underline{H}_3$—(CH$_2$)$_3$— |
| 3H, 1.25 ppm | C$\underline{H}_3$—(CH$_2$)—O— |
| Three 2H, 1.25 ppm | CH$_3$—(C$\underline{H}_2$)$_3$— |
| 2H, 2.07 ppm | —C$\underline{H}_2$—CH=CH—O— |
| 2H, 3.78 ppm | —O—C$\underline{H}_2$—CH$_3$ |
| 1H, 4.35 ppm, J=8.0 Hz | —CH$_2$—CH=C$\underline{H}$—O— |
| 1H, 5.93 ppm, J=6.8 Hz | —CH$_2$—C$\underline{H}$=CH—O— |

(b) Trans Isomer:

| NMR Data | Interpretation |
|---|---|
| 3H, 0.83 ppm | C$\underline{H}_3$—(CH$_2$)$_3$— |
| 3H, 1.25 ppm | C$\underline{H}_3$—(CH$_2$)—O— |
| Three 2H, 1.25 ppm | CH$_3$—(C$\underline{H}_2$)$_3$— |
| 2H, 1.88 ppm | —C$\underline{H}_2$—CH=CH—O— |
| 2H, 3.72 ppm | —O—C$\underline{H}_2$—CH$_3$ |
| 1H, 4.77 ppm, J=15.8 Hz | —CH$_2$—CH=C$\underline{H}$—O— |
| 1H, 6.18 ppm, J=14.0 Hz | —CH$_2$—C$\underline{H}$=CH—O— |

EXAMPLE III

PREPARATION OF 1-ETHOXYOCT-1-ENE

Reaction:

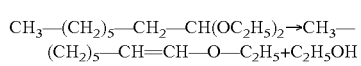

Into a 2 liter reaction flask equipped with stirrer, thermometer, heating mantle, addition funnel, vacuum apparatus, and reflux condenser the following ingredients were added at 17° C.:

| | |
|---|---|
| Primol (mineral oil) | 20.0 g |
| Pyridine | 4.10 g |
| Phosphoric acid | 5.90 g. |

With stirring, 1027.5 g n-octanal diethyl acetal was added and the pressure over the reaction mass was reduced to 300 mm Hg. The reaction mass temperature was then raised to 163° C. While maintaining the reaction mass temperature in the range of 159–163° C. with stirring, over a time period of 5 hours, the ethanol reaction product was continuously distilled. At the end of the 5 hour reaction period, the vacuum apparatus was disconnected from the reaction vessel and the contents thereof were cooled to 25° C., filtered through a 1:1 sodium bicarbonate:CELITE® filter and placed in a vacuum distillation apparatus equipped with a fractionation column and reflux condenser. The reaction mass was then distilled at the following conditions yielding fractions having the following content and organoleptic properties:

| Fraction Number(s) | Vapor Temperature | Pressure | Fraction(s) Content | Organoleptic Properties |
|---|---|---|---|---|
| 27 | 59° C. | 6.3 mm Hg | 1-ethoxyoct-1-ene (cis isomer) | Citrusy aroma with fresh air-dried laundry topnote |
| 23–53 | 45–75° C. | 2.33–10.9 mm Hg | 1-ethoxyoct-1-ene (55.6:44.3 trans:cis isomer ratio) | Citrusy, fresh air-dried laundry aroma with citrus, fresh air-dried laundry undertones |
| 54 | 46° C. | 2.33 mm Hg | 1-ethoxyoct-1-ene (trans isomer) | Citrusy, aldehydic fresh air-dried laundry aroma |

The resulting structures were confirmed by means of GC, mass spectral, IR and NMR analyses. The NMR data and interpretations are set forth in the following tables:

(a) Cis Isomer:

| NMR Data | Interpretation |
|---|---|
| 3H, 1.18 ppm | C$\underline{H}_3$—(CH$_2$)$_3$— |
| 3H, 1.28 ppm | C$\underline{H}_3$—(CH$_2$)—O— |
| Four 2H, 1.54 ppm | CH$_3$—(C$\underline{H}_2$)$_4$— |
| 2H, 2.15 ppm | —C$\underline{H}_2$—CH=CH—O— |
| 2H, 3.87 ppm | —O—C$\underline{H}_2$—CH$_3$ |
| 1H, 4.82 ppm, J=7.7 Hz | —CH$_2$—C$\underline{H}$=CH—O— |
| 1H, 6.34 ppm, J=6.3 Hz | —CH$_2$—CH=C$\underline{H}$—O— |

(b) Trans Isomer:

| NMR Data | Interpretation |
|---|---|
| 3H, 1.14 ppm | C$\underline{H}_3$—(CH$_2$)$_3$— |
| 3H, 1.45 ppm | C$\underline{H}_3$—(CH$_2$)—O— |

-continued

| NMR Data | Interpretation |
|---|---|
| Four 2H, 1.45 ppm | CH$_3$—(CH$_2$)$_4$— |
| 2H, 2.11 ppm | —CH$_2$—CH=CH—O— |
| 2H, 3.90 ppm | —O—CH$_2$—CH$_3$ |
| 1H, 4.85 ppm, J=16.3 Hz | —CH$_2$—CH=CH—O— |
| 1H, 6.38 ppm, J=13.2 Hz | —CH$_2$—CH=CH—O— |

EXAMPLE IV

PREPARATION OF 1-(PROP-2-EN)OXYOCT-1-ENE

Reaction:

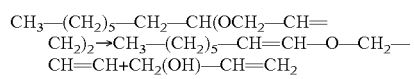

1-Octanal diallyl acetal was prepared by reacting 116.9 g allyl alcohol with 363 g n-octanal in the presence of 0.8 g p-toluene sulfonic acid catalyst at a temperature of 140–150° C. over a period of 1 hour. Then, into a 2 liter reaction flask equipped with stirrer, thermometer, heating mantle, addition funnel, vacuum apparatus, and reflux condenser the following ingredients are added at 17° C.:

| | |
|---|---|
| Primol (mineral oil) | 20.0 g |
| Pyridine | 7.6 g |
| Phosphoric acid | 11.3 g. |

With stirring, 419.8 g n-octanal diallyl acetal was added and the pressure over the reaction mass was reduced to 300 mm Hg. The reaction mass temperature was then raised to 180° C. While maintaining the reaction mass temperature in the range of 175–180° C. with stirring, over a time period of 3 hours, the allyl alcohol reaction product was continuously distilled. At the end of the 3 hour reaction period, the vacuum apparatus was disconnected from the reaction vessel and the contents thereof were cooled to 25° C. and quenched with 20.5 g sodium methoxide and then filtered through a 1:1 sodium bicarbonate:CELITE® filter and placed in a vacuum distillation apparatus equipped with a fractionation column and reflux condenser. The reaction mass was then distilled at 94° C. vapor temperature and 4.58 mm Hg pressure. The resulting product was a 50:50 cis:trans isomer mixture as confirmed by NMR, IR and mass spectral analyses. The resulting product has a green, dewy, rose, aldehydic, citrusy aroma with fresh sun-dried laundry topnotes and undertones.

EXAMPLE V

PREPARATION OF 1-ETHOXYNON-1-ENE

Reaction:

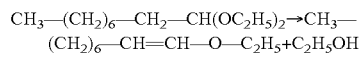

Into a 2 liter reaction flask equipped with stirrer, thermometer, heating mantle, addition funnel, vacuum apparatus, and reflux condenser the following ingredients were added at 18° C.:

| | |
|---|---|
| Primol (mineral oil) | 20.0 g |
| Pyridine | 1.85 g |
| Phosphoric acid | 1.49 g. |

With stirring, 307 g n-nonanal diethyl acetal was added and the pressure over the reaction mass was reduced to 300 mm Hg. The reaction mass temperature was then raised to 191° C. While maintaining the reaction mass temperature in the range of 191–201° C. with stirring, over a time period of 3 hours, the ethanol reaction product was continuously distilled. At the end of the 3 hour reaction period, the vacuum apparatus was disconnected from the reaction vessel and the contents thereof were cooled to 25° C. and placed in a vacuum distillation apparatus equipped with a fractionation column and reflux condenser. The reaction mass was then distilled at the following conditions yielding fractions having the following content and organoleptic properties:

| Fraction Number(s) | Vapor Temperature | Pressure | Fraction(s) Content | Organoleptic Properties |
|---|---|---|---|---|
| 12 | 130° C. | 64 mm Hg | 1-ethoxynon-1-ene (cis isomer) | Fresh, fatty, citrusy aroma with fatty, aldehydic undertones |
| 30 | 134° C. | 58 mm Hg | 1-ethoxynon-1-ene (92:8 trans:cis isomer ratio) | Aldehydic, fatty, carrot seed oil aroma with fatty undertones |
| 10–25 | 128–134° C. | 56–62 mm Hg | 1-ethoxynon-1-ene (52:47 cis:trans isomer ratio) | Aldehydic, citrusy, fatty, carrot seed oil aroma with fatty undertones |

The resulting structures were confirmed by means of GC, mass spectral, IR and NMR analyses. The NMR data and interpretations are set forth in the following tables:

(a) Cis Isomer:

| NMR Data | Interpretation |
|---|---|
| 3H, 1.16 ppm | CH$_3$—(CH$_2$)$_3$— |
| 3H, 1.49 ppm | CH$_3$—(CH$_2$)—O— |
| Five 2H, 1.57 ppm | CH$_3$—(CH$_2$)$_5$— |
| 2H, 2.27 ppm | —CH$_2$—CH=CH—O— |
| 2H, 3.95 ppm | —O—CH$_2$—CH$_3$ |
| 1H, 4.47 ppm, J=6.0 Hz | —CH$_2$—CH=CH—O— |
| 1H, 6.05 ppm, J=6.5 Hz | —CH$_2$—CH=CH—O— |

(b) Trans Isomer:

| NMR Data | Interpretation |
| --- | --- |
| 3H, 1.15 ppm | C$\underline{H}_3$—(CH$_2$)$_3$— |
| 3H, 1.47 ppm | C$\underline{H}_3$—(CH$_2$)—O— |
| Five 2H, 1.53 ppm | CH$_3$—(C$\underline{H}_2$)$_5$— |
| 2H, 2.13 ppm | —C$\underline{H}_2$—CH=CH—O— |
| 2H, 3.88 ppm | —O—C$\underline{H}_2$—CH$_3$ |
| 1H, 4.88 ppm, J=14.8 Hz | —CH$_2$—C$\underline{H}$=CH—O— |
| 1H, 6.38 ppm, J=12.5 Hz | —CH$_2$—CH=C$\underline{H}$—O— |

EXAMPLE VI

PREPARATION OF 1-METHOXYDEC-1-ENE

Reaction:

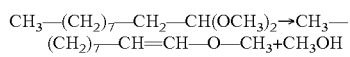

CH$_3$—(CH$_2$)$_7$—CH$_2$—CH(OCH$_3$)$_2$→CH$_3$—(CH$_2$)$_7$—CH=CH—O—CH$_3$+CH$_3$OH

Decanal dimethyl acetal was prepared by reacting 796 g decanal with 763.5 g trimethyl orthoformate in the presence of 1.97 g p-toluene sulfonic acid dissolved in 6.07 g methanol at a temperature of 45° C. for a period of time of 0.33 hours. The resulting product was washed with an aqueous 2.5% sodium bicarbonate solution, and then with water; dried over anhydrous sodium sulfate; filtered through CELITE®/sodium sulfate and distilled at 92–98° C. at 4.36–4.97 mm Hg. Then, into a 2 liter reaction flask equipped with stirrer, thermometer, heating mantle, addition funnel, vacuum apparatus, and reflux condenser the following ingredients were added at 17° C.:

| | |
| --- | --- |
| Primol (mineral oil) | 19.0 g |
| Pyridine | 17.7 g |
| Phosphoric acid | 25.1 g. |

The resulting mixture exothermed to 31° C. With stirring, 891 g n-decanal dimethyl acetal was added and the pressure over the reaction mass was reduced to 300 mm Hg. The reaction mass temperature was then raised to 180° C. While maintaining the reaction mass temperature in the range of 152–181° C. with stirring, over a time period of 5 hours, the methanol reaction product was continuously distilled At the end of the 5 hour reaction period, the vacuum apparatus was disconnected from the reaction vessel; and the reaction product was quenched with 19.1 g sodium methoxide; washed with 1000 cc saturated aqueous sodium chloride solution and filtered through CELITE®/sodium sulfate. The filtrate was cooled to 25° C. and placed in a vacuum distillation apparatus equipped with a fractionation column and reflux condenser. The reaction mass was then distilled at the following conditions yielding fractions having the following content and organoleptic properties:

| Fraction Number(s) | Vapor Temperature | Pressure | Fraction(s) Content | Organoleptic Properties |
| --- | --- | --- | --- | --- |
| 4 | 63° C. | 1.87 mm Hg | 1-methoxydec-1-ene (69:31 cis:trans isomer ratio) | Citrusy, burning candle aroma |
| 11 | 100° C. | 15.5 mm Hg | 1-methoxydec-1-ene (51:49 trans:cis isomer ratio) | Intense, fresh citrus, green, aldehydic, fresh dewy, rose aroma with waxy aldehydic character and fresh, clean, waxy, aldehydic and citrus topnotes and citrus undertones |
| 20 | 102° C. | 15.3 mm Hg | 1-methoxydec-1-ene (92:8 trans:cis isomer ratio) | Intense, fresh citrus, green, aldehydic, fresh, dewy, rose aroma and fresh, clean, aldehydic and citrus topnotes and citrus undertones |

The resulting structures are confirmed by means of GC, mass spectral, IR and NMR analyses. The NMR data and interpretations are set forth in the following tables:

(a) Cis Isomer:

| NMR Data | Interpretation |
| --- | --- |
| 3H, 1.16 ppm | C$\underline{H}_3$—(CH$_2$)$_3$— |
| 3H, 1.49 ppm | C$\underline{H}_3$—(CH$_2$)—O— |
| Five 2H, 1.57 ppm | CH$_3$—(C$\underline{H}_2$)$_5$— |
| 2H, 2.27 ppm | —C$\underline{H}_2$—CH=CH—O— |
| 2H, 3.95 ppm | —O—C$\underline{H}_2$—CH$_3$ |
| 1H, 4.47 ppm, J=6.0 Hz | —CH$_2$—C$\underline{H}$=CH—O— |
| 1H, 6.05 ppm, J=6.5 Hz | —CH$_2$—CH=C$\underline{H}$—O— |

(b) Trans Isomer:

| NMR Data | Interpretation |
| --- | --- |
| 3H, 1.15 ppm | C$\underline{H}_3$—(CH$_2$)$_3$— |
| 3H, 1.47 ppm | C$\underline{H}_3$—(CH$_2$)—O— |
| Five 2H, 1.53 ppm | CH$_3$—(C$\underline{H}_2$)$_5$— |
| 2H, 2.13 ppm | —C$\underline{H}_2$—CH=CH—O— |
| 2H, 3.88 ppm | —O—C$\underline{H}_2$—CH$_3$ |
| 1H, 4.88 ppm, J=14.8 Hz | —CH$_2$—C$\underline{H}$=CH—O— |
| 1H, 6.38 ppm, J=12.5 Hz | —CH$_2$—CH=C$\underline{H}$—O— |

EXAMPLE VII

PREPARATION OF 1-ETHOXYDEC-1-ENE

Reaction:

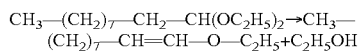

Decanal diethyl acetal was prepared by reacting 316 g decanal with 354 g triethyl orthoformate in the presence of 7.6 g ammonium nitrate dissolved in 20 ml. ethanol at a temperature of 50° C. for a period of time of 4 hours. The resulting product was quenched with 32 g sodium methoxide and distilled at 170° C. at 8.0 mm Hg pressure. Then, into a 2 liter reaction flask equipped with stirrer, thermometer, heating mantle, addition funnel, vacuum apparatus, and reflux condenser the following ingredients are added at 20°:

| | |
|---|---|
| Primol (mineral oil) | 19.0 g |
| Pyridine | 3.5 g |
| Phosphoric acid | 1.8 g. |

With stirring, 406 g n-decanal diethyl acetal was added and the pressure over the reaction mass was reduced to 300 mm Hg. The reaction mass temperature was then raised to 180° C. While maintaining the reaction mass temperature in the range of 174–231° C., with stirring, over a time period of 12 hours, the ethanol reaction product was continuously distilled. At the end of the 12 hour reaction period, the vacuum apparatus was disconnected from the reaction vessel; and the reaction product was quenched with 1.3 g triethyl amine. The resulting product was placed in a vacuum distillation apparatus equipped with a fractionation column and reflux condenser. The reaction mass was then distilled at the following conditions yielding fractions having the following properties:

The resulting structures were confirmed by means of GC, mass spectral, IR and NMR analyses. The NMR data and interpretations are set forth in the following tables:

(a) Cis Isomer:

| NMR Data | Interpretation |
|---|---|
| 3H, 0.90 ppm | C$\underline{H}_3$—(CH$_2$)$_3$— |
| 3H, 1.25 ppm | C$\underline{H}_3$—(CH$_2$)—O— |
| Six 2H, 1.25 ppm | CH$_3$—(C$\underline{H}_2$)$_6$— |
| 2H, 2.08 ppm | —C$\underline{H}_2$—CH=CH—O— |
| 2H, 3.75 ppm | —O—C$\underline{H}_2$—CH$_3$ |
| 1H, 4.33 ppm, J=7.4 Hz | —CH$_2$—C$\underline{H}$=CH—O— |
| 1H, 5.91 ppm, J=6.5 Hz (doublet of tripletts) | —CH$_2$—CH=C$\underline{H}$—O— |

(b) Trans Isomer:

| NMR Data | Interpretation |
|---|---|
| 3H, 0.88 ppm | C$\underline{H}_3$—(CH$_2$)$_3$— |
| 3H, 1.32 ppm | C$\underline{H}_3$—(CH$_2$)—O— |
| Six 2H, 1.32 ppm | CH$_3$—(C$\underline{H}_2$)$_6$— |
| 2H, 1.93 ppm | —C$\underline{H}_2$—CH=CH—O— |
| 2H, 3.72 ppm | —O—C$\underline{H}_2$—CH$_3$ |
| 1H, 4.77 ppm, J=13.8 Hz | —CH$_2$—C$\underline{H}$=CH—O— |
| 1H, 6.20 ppm, J=12.6 Hz | —CH$_2$—CH=C$\underline{H}$—O— |

EXAMPLE VIII

PREPARATION OF 1-ETHOXYUNDEC-1-ENE

Reaction:

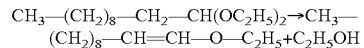

| Fraction Number(s) | Vapor Temperature | Pressure | Fraction(s) Content | Organoleptic Properties |
|---|---|---|---|---|
| 8 | 89° C. | 7.4 mm Hg | 1-ethoxydec-1-ene (cis isomer) | Aldehydic, fatty, cucumber, orris aroma with waxy, fatty, aldehydic topnotes and juicy, petitgrain, fresh orange and coriander undertones |
| 9–11 | 86° C. | 8.4–8.9 mm Hg | 1-ethoxydec-1-ene (58:42 cis:trans isomer ratio) | Fresh, clean, aldehydic, fresh, dewy, rose aroma and fresh, clean, aldehydic, citrus topnotes |
| 22 | 90° C. | 7.7 mm Hg | 1-ethoxydec-1-ene (96:4 trans:cis isomer ratio) | Strong, fresh, clean, aldehydic, citrus, green, dewy, rose aroma with green, ozoney, floral, citrus, winey, fatty topnotes |
| 11–21 | 86–88° C. | 4.75–8.50 mm Hg | 1-ethoxydec-1-ene (55:45 cis:trans isomer ratio) | Fragrance: Fresh, clean, aldehydic, citrus, green, dewy, rose aroma with fresh, clean, aldehydic, citrus topnotes; Flavor: Green, tart, orange taste with pulpy tart orange juice and orange peel nuances |

Into a 1 liter reaction flask equipped with stirrer, thermometer, heating mantle, addition funnel, vacuum apparatus, and reflux condenser the following ingredients are added at 18° C.:

| | |
|---|---|
| Primol (mineral oil) | 24.3 g |
| Pyridine | 10.2 g |
| Phosphoric acid | 14.6 g. |

The resulting mixture exothermed to 37° C. 630.5 g n-undecanal diethyl acetal was added with stirring and the pressure over the reaction mass was reduced to 300 mm Hg. The reaction mass temperature was then raised to 140° C. While maintaining the reaction mass temperature in the range of 140–194° C. and the reaction mass pressure in the range of 200–300 mm Hg with stirring, over a time period of 6 hours, the ethanol reaction product was continuously distilled. At the end of the 6 hour reaction period, the reaction mass was quenched with 1.7 g triethylamine. The vacuum apparatus was then disconnected from the reaction vessel and the contents thereof were cooled to 25° C. and placed in a vacuum distillation apparatus equipped with a fractionation column and reflux condenser. The reaction mass was then distilled at the following conditions yielding fractions having the following content and organoleptic properties:

| Fraction Number(s) | Vapor Temperature | Pressure | Fraction(s) Content | Organoleptic Properties |
|---|---|---|---|---|
| 5 | 86° C. | 2.29 mm Hg | 1-ethoxyundec-1-ene (91.6:7.9 cis:trans isomer ratio) | Fresh air-dried laundry aroma with fatty undertones |
| 30–39 | 115–117° C. | 8.3–10.4 mm Hg | 1-ethoxyundec-1-ene (41:56 trans:cis isomer ratio) | Sun-dried laundry aroma with substantive sun-dried laundry undertones |
| 40 | 116° C. | 8.3 mm Hg | 1-ethoxyundec-1ene (90.3:9.0 trans:cis ratio) | Sun-dried laundry aroma |

The resulting structures are confirmed by means of GC, mass spectral, IR and NMR analyses. The NMR data and interpretations are set forth in the following tables:

(a) Cis Isomer:

| NMR Data | Interpretation |
|---|---|
| 3H, 0.87 ppm | C$\underline{H}_3$—(CH$_2$)$_3$— |
| 3H, 1.29 ppm | C$\underline{H}_3$—(CH$_2$)—O— |
| Seven 2H, 1.29 ppm | CH$_3$—(C$\underline{H}_2$)$_7$— |
| 2H, 2.10 ppm | —C$\underline{H}_2$—CH=CH—O— |
| 2H, 3.78 ppm | —O—C$\underline{H}_2$—CH$_3$ |
| 1H, 4.36 ppm, J=6.2 Hz | —CH$_2$—C$\underline{H}$=CH—O— |
| 1H, 5.92 ppm, J=6.8 Hz | —CH$_2$—CH=C$\underline{H}$—O— |

(b) Trans Isomer:

| NMR Data | Interpretation |
|---|---|
| 3H, 0.89 ppm | C$\underline{H}_3$—(CH$_2$)$_3$— |
| 3H, 1.27 ppm | C$\underline{H}_3$—(CH$_2$)—O— |
| Seven 2H, 1.27 ppm | CH$_3$—(C$\underline{H}_2$)$_7$— |
| 2H, 1.89 ppm | —C$\underline{H}_2$—CH=CH—O— |
| 2H, 3.70 ppm | —O—C$\underline{H}_2$—CH$_3$ |
| 1H, 4.77 ppm, J=15.7 Hz | —CH$_2$—C$\underline{H}$=CH—O— |
| 1H, 6.20 ppm, J=13.1 Hz | —CH$_2$—CH=C$\underline{H}$—O— |

EXAMPLE IX

PREPARATION OF 1-ETHOXYUNDECA-1,10-DIENE

Reaction:

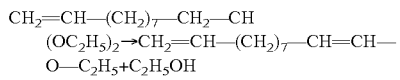

CH$_2$=CH—(CH$_2$)$_7$—CH$_2$—CH(OC$_2$H$_5$)$_2$→CH$_2$=CH—(CH$_2$)$_7$—CH=CH—O—C$_2$H$_5$+C$_2$H$_5$OH

Into a 2 liter reaction flask equipped with stirrer, thermometer, heating mantle, addition funnel, vacuum apparatus, and reflux condenser the following ingredients are added at 18° C.:

| | |
|---|---|
| Primol (mineral oil) | 20.1 g |
| Pyridine | 12.8 g |
| Phosphoric acid | 18.1 g. |

The resulting mixture exothermed to 40° C. With stirring, 916 g 10-undecen-1-al diethyl acetal was added and the pressure over the reaction mass was reduced to 300 mm Hg. The reaction mass temperature was then raised to 126° C. While maintaining the reaction mass temperature in the range of 126–190° C. and the reaction mass pressure at 300 mm Hg with stirring, over a time period of 4 hours, the ethanol reaction product was continuously distilled. At the end of the 4 hour reaction period, the reaction mass was quenched with 2.1 g triethylamine. The vacuum apparatus was then disconnected from the reaction vessel and the contents thereof were cooled to 25° C. and placed in a vacuum distillation apparatus equipped with a fractionation column and reflux condenser. The reaction mass was then distilled at the following conditions yielding fractions having the following content and organoleptic properties:

| Fraction Number(s) | Vapor Temperature | Pressure | Fraction(s) Content | Organoleptic Properties |
|---|---|---|---|---|
| 14 | 93° C. | 3.5 mm Hg | 1-ethoxyundeca-1,10-diene (82:18 cis:trans isomer ratio) | Aldehydic, citrus, orange aroma with tangerine topnotes |
| 14–42 | 91–102° C. | 2.10–3.64 mm Hg | 1-ethoxyundeca-1,10-diene (48:47 trans:cis isomer ratio) | aldehydic, ozoney aroma |
| 40 | 101° C. | 3.36 mm Hg | 1-ethoxyundeca-1,10-diene (trans isomer) | Aldehydic, green aroma |

The resulting structures were confirmed by means of GC, mass spectral, IR and NMR analyses. The NMR data and interpretations are set forth in the following tables:

(a) Cis Isomer:

| NMR Data | Interpretation |
|---|---|
| 2H, 2.10 ppm | $CH_2=CH-\underline{CH}_2-$ |
| 2H, 4.99 ppm | $\underline{CH}_2=CH-CH_2-$ |
| 1H, 5.80 ppm | $CH_2=\underline{CH}-CH_2-$ |
| 3H, 1.24 ppm | $\underline{CH}_3-(CH_2)-O-$ |
| Five 2H, 1.24 ppm | $CH_3-(\underline{CH}_2)_5-$ |
| 2H, 2.10 ppm | $-\underline{CH}_2-CH=CH-O-$ |
| 2H, 3.75 ppm | $-O-\underline{CH}_2-CH_3$ |
| 1H, 4.35 ppm, J=6.0 Hz | $-CH_2-\underline{CH}=CH-O-$ |
| 1H, 5.90 ppm, J=6.5 Hz | $-CH_2-CH=\underline{CH}-O-$ |

(b) Trans Isomer:

| NMR Data | Interpretation |
|---|---|
| 1H, 2.03 ppm | $CH_2=CH-\underline{CH}_2-$ |
| 2H, 5.02 ppm | $\underline{CH}_2=CH-CH_2-$ |
| 1H, 5.87 ppm | $CH_2=\underline{CH}-CH_2-$ |
| 3H, 1.27 ppm | $\underline{CH}_3-(CH_2)-O-$ |
| Five 2H, 1.27 ppm | $CH_3-(\underline{CH}_2)_5-$ |
| 2H, 1.81 ppm | $-\underline{CH}_2-CH=CH-O-$ |
| 2H, 3.63 ppm | $-O-\underline{CH}_2-CH_3$ |
| 1H, 6.25 ppm, J=15.7 Hz | $-CH_2-\underline{CH}=CH-O-$ |
| 1H, 4.80 ppm, J=15.0 Hz | $-CH_2-CH=\underline{CH}-O-$ |

EXAMPLE X

PREPARATION OF 1-ETHOXYDODEC-1-ENE

Reaction:

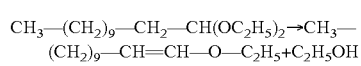

Into a 1.5 liter reaction flask equipped with stirrer, thermometer, heating mantle, addition funnel, vacuum apparatus, and reflux condenser the following ingredients are added at 18° C.:

| | |
|---|---|
| Primol (mineral oil) | 20.8 g |
| Pyridine | 12.5 g |
| Phosphoric acid | 18.0 g. |

With stirring, 823.3 g n-dodecanal diethyl acetal was added and the pressure over the reaction mass was reduced to 300 mm Hg. The reaction mass temperature was then raised to 100° C. While maintaining the reaction mass temperature in the range of 100–203° C. and the reaction mass pressure in the range of 275–300 mm Hg with stirring, over a time period of 3 hours, the ethanol reaction product was continuously distilled. At the end of the 3 hour reaction period, the reaction mass was quenched with 2.4 g triethylamine. The vacuum apparatus was then disconnected from the reaction vessel and the contents thereof were cooled to 25° C. and placed in a vacuum distillation apparatus equipped with a fractionation column and reflux condenser. The reaction mass was then distilled at the following conditions yielding fractions having the following content and organoleptic properties:

| Fraction Number(s) | Vapor Temperature | Pressure | Fraction(s) Content | Organoleptic Properties |
|---|---|---|---|---|
| 18 | 98° C. | 2.64 mm Hg | 1-ethoxydodec-1-ene (87.4:12.6 cis:trans isomer ratio) | Mushroom aroma |
| 20–43 | 91–98° C. | 2.10–2.47 mm Hg | 1-ethoxydodec-1-ene (50:50 trans:cis isomer ratio) | Fresh, aldehydic, citrus aroma |
| 44 | 98° C. | 2.38 mm Hg | 1-ethoxydodec-1 ene (trans isomer) | Aldehydic, citrus aroma |

The resulting structures are confirmed by means of GC, mass spectral, IR and NMR analyses. The NMR data and interpretations are set forth in the following tables:

(a) Cis Isomer:

| NMR Data | Interpretation |
|---|---|
| 3H, 0.87 ppm | $\underline{CH}_3-(CH_2)_3-$ |
| 3H, 1.29 ppm | $\underline{CH}_3-(CH_2)-O-$ |

-continued

| NMR Data | Interpretation |
|---|---|
| Seven 2H, 1.29 ppm | CH$_3$—(CH$_2$)$_7$— |
| 2H, 2.10 ppm | —CH$_2$—CH=CH—O— |
| 2H, 3.78 ppm | —O—CH$_2$—CH$_3$ |
| 1H, 4.36 ppm, J=6.2 Hz | —CH$_2$—CH=CH—O— |
| 1H, 5.92 ppm, J=6.8 Hz | —CH$_2$—CH=CH—O— |

(b) Trans Isomer:

| NMR Data | Interpretation |
|---|---|
| 3H, 0.89 ppm | CH$_3$—(CH$_2$)$_3$— |
| 3H, 1.27 ppm | CH$_3$—(CH$_2$)—O— |
| Seven 2H, 1.27 ppm | CH$_3$—(CH$_2$)$_7$— |
| 2H, 1.89 ppm | —CH$_2$—CH=CH—O— |
| 2H, 3.70 ppm | —O—CH$_2$—CH$_3$ |
| 1H, 4.77 ppm, J=15.7 Hz | —CH$_2$—CH=CH—O— |

EXAMPLE XI

PREPARATION OF 1-GERANYLOXYHEPT-1-ENE

Reaction:

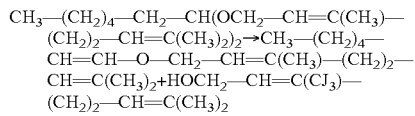

1-Heptanal digeranyl acetal was prepared by reacting 151 g geraniol with 72 g n-heptanal in the presence of 0.3 g p-toluene sulfonic acid catalyst at a temperature of 90° C. over a period of 2 hours. The resulting acetal was fractionally distilled at a vapor temperature of 127° C. and a pressure of 1.79 mm Hg. Then, into a 1 liter reaction flask equipped with stirrer, thermometer, heating mantle, addition funnel, vacuum apparatus, and reflux condenser the following ingredients are added at 17° C.:

| | |
|---|---|
| Primol (mineral oil) | 20.0 g |
| Pyridine | 7.6 g |
| Phosphoric acid | 11.3 g. |

With stirring, 162 g n-heptanal digeranylacetal was added and the pressure over the reaction mass was reduced to 300 mm Hg. The reaction mass temperature was then raised to 190° C. The geraniol reaction product is continuously distilled while maintaining the reaction mass temperature in the range of 175–205° C. with stirring over a time period of 3 hours. At the end of the 3 hour reaction period, the vacuum apparatus was disconnected from the reaction vessel and the contents thereof were cooled to 25° C., and quenched with 20.5 g sodium methoxide and then filtered through a 1:1 sodium bicarbonate:CELITE® filter and placed in a vacuum distillation apparatus equipped with a fractionation column and reflux condenser. The reaction mass was then distilled at 112–125° C. vapor temperature and 1.51–1.73 mm Hg pressure. The resulting product was a 20:20:30:30 cis:cis, trans:trans, cis:trans, trans:cis isomer mixture as confirmed by NMR, IR and mass spectral analyses. The resulting product had a green, floral, aldehydic, citrusy aroma with fresh air-dried laundry topnotes and undertones.

EXAMPLE XII

Orange Beverage Formulations (A) Bulked distillation fractions 11–21 consisting of 1-ethoxydec-1-ene (55:45 cis:trans isomer ratio) of the distillation of Example VII was added at rates of 50, 100 and 150 ppb to three sweetened, acidified beverage samples: CANADA DRY® carbonated water (pH=5.7; 0.5% sucrose). Single fold orange oil is added to the same beverage samples at the rates of 2500 ppm, 5000 ppm and 7500 ppm, respectively. The resulting beverages were compared with beverage samples containing (a) only single fold orange oil at rates of 2500 ppm, 5000 ppm and 7500 ppm and (b) single fold orange oil at the rates of 2500 ppm, 5000 ppm and 7500 ppm taken together with n-decanal at rates of 50, 100 and 150 ppb. The samples containing the 1-ethoxydec-1-ene are greener, "natural" orange juice-like, and more tart orange. The samples containing the n-decanal had fresh, juicy, pulpy orange, sweet, fatty aroma and taste nuances. With respect to aroma and taste quality, the samples containing the 1-ethoxydec-1-ene of Example VII were rated at "10" whereas the samples containing the n-decanal were rated at "7.5". The samples containing only the orange oil were rated at "3.0" by a panelists rating the samples on a scale of 1–10.

(B) Distillation fraction 11 consisting of 1-methoxydec-1-ene (51:49 trans:cis isomer ratio) of the distillation of Example VI was added at rates of 50, 100 and 150 ppb to three sweetened, acidified beverage samples: CANADA DRY® carbonated water (pH=5.7; 0.5% sucrose). Single fold orange oil was added to the same beverage samples at the rates of 2500 ppm, 5000 ppm and 7500 ppm, respectively. The resulting beverages were compared with beverage samples containing (a) only single fold orange oil at rates of 2500 ppm, 5000 ppm and 7500 ppm and (b) single fold orange oil at the rates of 2500 ppm, 5000 ppm and 7500 ppm taken together with n-decanal at rates of 50, 100 and 150 ppb. The samples containing the 1-methoxydec-1-ene provided distinctive desirable orange peel oil nuances to the beverage, and the beverage was of an "orange zest" type, being "natural" orange juice-like, and more tart orange than the other samples. The samples containing the n-decanal had fresh, juicy, pulpy orange, sweet, fatty aroma and taste nuances. With respect to aroma and taste quality, the samples containing the 1-methoxydec-1-ene of Example VI were rated at "10" whereas the samples containing the n-decanal were rated at "7.5". The samples containing only the orange oil were rated at "3.0" by panelists rating the samples on a scale of 1–10.

EXAMPLE XIII

"Lemon Meringue" Fragrance Formulation

The following fragrance formulation was prepared:

| | PARTS BY WEIGHT | |
|---|---|---|
| INGREDIENTS | XIII(A) | XIII(B) |
| delta decalactone | 10 | 10 |
| citral | 30 | 30 |
| cyclotene | 40 | 40 |
| ethyl caproate | 2 | 2 |
| ethyl vanillin | 50 | 50 |
| dihydromethyl jasmonate | 20 | 20 |

-continued

| INGREDIENTS | PARTS BY WEIGHT | |
|---|---|---|
| | XIII(A) | XIII(B) |
| isopropyl myristate | 120 | 120 |
| lemon oil | 10 | 10 |
| lemon terpenes | 598 | 598 |
| gamma undecalactone | 10 | 10 |
| 2,5-dimethyl-3-hydroxyfuran | 15 | 15 |
| rhodinyl butyrate | 20 | 20 |
| saccharin | 5 | 5 |
| 3-hydroxy-2-methyl-4-pyrone | 50 | 50 |
| 1-ethoxydec-1-ene (55:45 cis:trans isomer mixture) prepared according to Example VII, bulked distillation fractions 11–21 | 60 | 0 |
| 1-methoxydec-1-ene (51:49 trans:cis isomer mixture) prepared according to Example VI, distillation fraction 11 | 0 | 60 |

The 1-ethoxydec-1-ene isomer mixture imparted to this "lemon meringue" formulation having a 'natural' lemon aroma, intense, fresh citrus, green, aldehydic, fresh, dewy, rose undertones and fresh, clean, aldehydic and citrus topnotes. The 1-methoxydec-1-ene imparted to this "lemon meringue" formulation having a natural "lemon" aroma, intense fresh citrus, green, aldehydic, fresh, dewy, rose undertones with fresh, clean, aldehydic, and citrusy topnotes.

EXAMPLE XIV

Preparation of Cosmetic Compositions

A cosmetic powder was prepared by mixing in a ball mill 100 grams of talcum powder with 0.15 grams of the fragrance composition "XIII(A)" prepared according to Example XIII The resulting powder had an excellent natural lemon aroma with intense fresh citrus, green, aldehydic, fresh, dewy, rose undertones and citrus topnotes.

A second cosmetic powder was prepared by mixing in a ball mill 100 grams of talcum powder with 0.20 grams of the perfume composition of Example XIII(B). The resulting powder had an excellent lemon aroma with intense, fresh, citrus, green, aldehydic, fresh, dewy, rose undertones and fresh, clean aldehydic topnotes.

EXAMPLE XV

Preparation of Soap Cake 100 grams of soap chips were prepared according to Example V of U.S. Pat. No. 4,058,490, the specification for which is incorporated by reference herein. The soap chips were blended in a chip mixer with 40 grams of water and 4 grams of titanium dioxide The resulting blend was then admixed with one gram of the lemon fragrance composition of Example XIII(B) until a homogeneous blend was obtained. The resulting blend was formulated into a soap cake and dried under 150 mm Hg. absolute pressure. The perfumed soap cake manifested an excellent, substantive, intense lemon aroma with intense, fresh, citrus, green, aldehydic, fresh, dewy, rose undertones and fresh, clean aldehydic topnotes.

What is claimed is:

1. A compound 1-methoxydec-1-ene wherein the ratio of cis:trans isomer is about 51:49.

2. The compound of claim 1 wherein the compound is synthetically produced.

3. The compound of claim 1 wherein the compound is substantially pure.

4. A compound 1-ethoxydec-1-ene wherein the ratio of cis:trans isomer is about 55:45.

5. The compound of claim 4 wherein the compound is synthetically produced.

6. The compound of claim 4 wherein the compound is substantially pure.

7. A process for augmenting, enhancing or imparting taste in or to a consumable material selected from the group consisting of foodstuffs, chewing gums and beverages comprising the step of admixing with a consumable material base a taste imparting, augmenting or enhancing quantity and concentration of the compound of claim 1.

8. A process for augmenting, enhancing or imparting an aroma in or to a consumable material selected from the group consisting of perfume compositions, perfumed articles and colognes comprising the step of admixing with a consumable material base an aroma imparting, augmenting or enhancing quantity and concentration of the compound of claim 4.

* * * * *